(12) United States Patent
Christie et al.

(10) Patent No.: US 11,228,108 B2
(45) Date of Patent: Jan. 18, 2022

(54) MULTIBAND CIRCULARLY POLARISED ANTENNA

(71) Applicant: Arralis Holdings Limited, Hong Kong (CN)

(72) Inventors: Steven Christie, Drumbo (GB); Denver Humphrey, Ballymena (GB)

(*) Notice: Subject to any disclaimer, the term of this patent is extended or adjusted under 35 U.S.C. 154(b) by 0 days.

(21) Appl. No.: 16/328,815

(22) PCT Filed: Aug. 29, 2017

(86) PCT No.: PCT/EP2017/071617
§ 371 (c)(1),
(2) Date: Feb. 27, 2019

(87) PCT Pub. No.: WO2018/041809
PCT Pub. Date: Mar. 8, 2018

(65) Prior Publication Data
US 2019/0214731 A1     Jul. 11, 2019

(30) Foreign Application Priority Data
Aug. 29, 2016 (EP) .................................. 16186171

(51) Int. Cl.
*H01Q 9/04*     (2006.01)
*H01P 5/10*     (2006.01)
(Continued)

(52) U.S. Cl.
CPC .......... *H01Q 9/0428* (2013.01); *G01S 19/01* (2013.01); *H01P 5/10* (2013.01); *H01Q 1/38* (2013.01);
(Continued)

(58) Field of Classification Search
CPC .......... H01Q 9/27; H01Q 9/0428; H01Q 1/38; H01Q 1/48; H01Q 15/008; H01Q 15/14; H01Q 21/065; G01S 19/01; H01P 5/10
(Continued)

(56) References Cited

U.S. PATENT DOCUMENTS

| 2009/0174623 A1 | 7/2009 | Schreider et al. | |
| 2010/0039343 A1* | 2/2010 | Uno ......................... | H01Q 3/24 343/818 |
| 2013/0249762 A1* | 9/2013 | Grelier ................... | H01Q 19/18 343/834 |

FOREIGN PATENT DOCUMENTS

| CN | 104836033 | 8/2015 |
| JP | 58134511 | 8/1983 |

(Continued)

OTHER PUBLICATIONS

A Novel Broadband EBG Using Multi-period Mushroom-like Structure; L. Liang; National Key Laboratory of Antennas and Microwave Technology Xidian University, Xi' an 710071 China (Year: 2008).*

(Continued)

*Primary Examiner* — Anh Q Tran
(74) *Attorney, Agent, or Firm* — Renner Kenner Greive Bobak Taylor & Weber

(57) ABSTRACT

The present invention provides a circularly polarised, CP, antenna device for multiband GNSS. It comprises a spiral antenna and a high impedance surface, HIS, comprising a conductive layer comprising a first region and a separate second region, and a ground plane. The first region of the conductive layer is provided with at least one resonant element of a first resonant frequency and the second region of the conductive layer is provided with at least one resonant element of a second resonant frequency.

16 Claims, 6 Drawing Sheets

(51) Int. Cl.
*H01Q 15/00* (2006.01)
*H01Q 1/48* (2006.01)
*G01S 19/01* (2010.01)
*H01Q 15/14* (2006.01)
*H01Q 1/38* (2006.01)
*H01Q 9/27* (2006.01)
*H01Q 21/06* (2006.01)

(52) U.S. Cl.
CPC ............... *H01Q 1/48* (2013.01); *H01Q 9/27* (2013.01); *H01Q 15/008* (2013.01); *H01Q 15/14* (2013.01); *H01Q 21/065* (2013.01)

(58) Field of Classification Search
USPC .............................. 343/753–756, 836, 909
See application file for complete search history.

(56) References Cited

FOREIGN PATENT DOCUMENTS

| | | |
|---|---|---|
| JP | 01502313 | 8/1988 |
| JP | 0575331 | 3/1993 |
| JP | 11163622 | 6/1999 |
| JP | 2005079794 | 3/2005 |
| WO | 01/01514 A1 | 1/2001 |
| WO | 2018/041809 A1 | 3/2018 |

OTHER PUBLICATIONS

International Search Report and the Written Opinion of the International Searching Authority, International Application No. PCT/EP2017/071617, International Filing Date: Aug. 29, 2017, entitled "A Multiband Circularly Polarised Antenna", dated Nov. 14, 2017.
Kraft, "Polarisation properties of small printed spiral antennas with four resistively loaded arms", IEE Proceedings: Microwaves, Antennas and Propagation, III, Stevenage, Herts, GB, vol. 144, No. 2, Apr. 11, 1997, pp. 131-135.
Morgan, "Spiral antennas for ESM", IEEE Proceedings section A A I, vol. 132, No. 4, Jul. 1, 1985, pp. 245-251.
A Dual-band High Impedance Surface mounted with a spiral antenna for GNSS applications; IEEE, 2011.
A Novel Broadband EBG Using Multi-period Mushroom-like Structure; L. Liang; National Key Laboratory of Antennas and Microwave Technology Xidian University, Xi' an 710071 China, 2008.
Selective High Impedance Surface Active Region Loading of Archimedean Spiral Antenna; Sarah Mohamad, Robert Cahill, Senior Member, IEEE, and Vincent Fusco, Fellow, IEEE, 2014.
Chinese Office Action and Search Report (dated Apr. 2020).
European Exam Report (dated May 2020).

\* cited by examiner

MULTIBAND CIRCULARLY POLARISED ANTENNA

This application is the U.S. National Stage of International Application No. PCT/EP2017/071617, filed Aug. 29, 2017, which designates the U.S., published in English, and claims priority under 35 U.S.C. § 119 or 365(c) to European Application No. 16186171.1, filed Aug. 29, 2016. The entire teachings of the above applications are incorporated herein by reference.

FIELD

The present invention relates to a Low Size Weight and Power (SWaP) circularly polarised (CP) antenna. More particularly, the invention relates to a low SWaP circularly polarised antenna suitable for multi-band communications, for applications such as Global Navigational Satellite Systems (GNSS).

BACKGROUND

Low Size, Weight and Power (SWaP) antennas are beneficial for many applications, such as for example in mobile or wearable devices. Circularly Polarised (CP) antennas are required for communications between satellites and terrestrial systems, in order to overcome Faraday rotation, whereby the electric field vector of a signal is rotated as it propagates through the ionosphere.

One type of CP antenna is a spiral antenna. A conventional spiral antenna is shown in FIG. 1. It consists of two spiral arms, which are excited in antiphase (180° electrical phase difference) at their inner terminations. The geometry of the spiral arms can be described by many different mathematical expressions, such as the Archimedean spiral (as shown in FIG. 1), equiangular spiral, meandered spiral, or other arbitrary spiral shapes. However, the principle by which radiation is emitted remains the same regardless of the geometry. When the circumference of the antenna is much smaller than the wavelength, the antenna acts similarly to a twin transmission line, and any radiation from the two arms cancels out due to their phasing. Radiation occurs at a certain frequency, $f_r$, when the path length from point A to point B on the same spiral arm is equal to one half of the guide wavelength, $\lambda_g/2$, which produces an additional electrical phase delay of 180° at point B relative to point A. Points A and A' are symmetrically located on opposing arms. Thus, the current at these points is in antiphase, as the paths lengths to these points from the arms' centres are equal. This means that at frequency $f_r$, the currents at neighbouring points A' and B on adjacent arms are in equal phase (and likewise at points A and B'), and the radiation from each of the two arms therefore add together in phase. The active region of the antenna, from which it radiates strongly, is therefore a ring of circumference $\lambda_g$, or radius $\lambda_g/2\pi$. The antenna emits circularly polarised radiation from this active region, because the fields are rotated and phase delayed by an additional 90° along every 90° step change in angle relative to the centre of the ring, as shown in FIG. 2. FIG. 3 shows how the radiation from such an antenna is emitted bi-directionally, producing a front-lobe and a back-lobe. Because of its geometry, the spiral antenna can satisfy this condition for radiation over wide bandwidths, with radiation at lower frequencies being emitted from further out on the spiral arms.

Wearable and surface mountable spiral antennas require electrical isolation between their back side and the mounting surface. This electrical isolation is required to prevent 'contact' effects such as short-circuiting, whereby close proximity of the antenna to a metal or a high permittivity object (such as a human body or head) would otherwise destroy the antenna's radiation pattern and return loss characteristics. Electrical isolation is typically achieved by using either a ground plane reflector or an absorber.

In the case of a ground plane reflector, a flat conductive surface is placed below the antenna with an air gap separation of $\lambda_0/4$ at the operating frequency, as shown in FIG. 4. The antenna back lobe arrives at the reflector with 90° electrical phase delay due to the $\lambda_0/4$ separation. The incident E-field is tangential to the surface of the conductor, and this gives rise to a reflected signal with an E-field which has a relative phase of 180°. The $\lambda_0/4$ path length provides an additional 90° electrical phase delay, producing a total phase delay of 360°, meaning that the reflected back lobe arrives in phase with the front lobe. This increases the antenna gain by 3 dB at the operating frequency, but limits the bandwidth over which the antenna emits CP radiation, and leads to thick devices at low frequencies, where $\lambda_0$ is large. It will be appreciated that this is undesirable, as one of the benefits of spiral antennas is their wide bandwidth.

Where an absorber is placed on the back side of the antenna, the back lobe radiation is absorbed, providing electrical isolation whilst maintaining a wide bandwidth. However, this approach has the drawback of losing half the radiated power. It also requires a thick device of minimum thickness of approximately $\lambda_0/14$, as placing the absorber too close causes the fields between the spiral arms to be absorbed, preventing the antenna from radiating efficiently.

A more recent alternative approach is to use a High Impedance Surface (HIS) in place of the ground plane reflector. Various HIS topologies exist. One such topology is disclosed in U.S. Pat. No. 6,384,797. As shown in FIG. 5, this topology consists of a periodic series of conductive resonant elements, such as patches or slots, above a conductive ground plane. The resonant elements may or may not be connected to the ground plane by metal vias. In addition, the HIS may or may not employ dielectric materials between the two conductive layers. The spiral antenna is typically separated from the HIS by an air gap, but the antenna may employ a dielectric material gap.

The operation is similar to that of a ground plane reflector, with the HIS ground plane reflecting the antenna back lobe in the forwards direction. However, the design of the HIS resonant element, ground plane separation, and dielectric material allows control over the phase of the signal reflected from the HIS ground plane. This allows the antenna to be placed much closer to the HIS than the $\lambda_0/4$ separation of a standard conductive reflector. In one known implementation, a separation between the antenna and the HIS ground plane as low as $\lambda_0/12$ has been achieved. However, one drawback of using one HIS resonator unit cell is that it only provides a narrow-band solution. It is known that the inherently narrow bandwidth is proportional to the thickness and permittivity of the dielectric material. Therefore, the bandwidth can be increased by increasing the thickness of the dielectric, and by choosing a dielectric with a high permittivity. However, this is undesirable when the aim is for a small, light-weight device. It may also be impractical due to available thicknesses of dielectric materials being too thin. To provide a multi-band solution, it is also known to provide a nested HIS topology, which involves placing smaller HIS resonant elements towards the centre of the antenna, with larger elements on the exterior, in order to provide operation over distinct active regions, as shown in FIG. 6. In such a configuration, one region of reflective elements of a higher frequency are located under the corresponding active area of the antenna at this higher frequency and a second region of reflective elements of a lower frequency are aligned around this region, under the corresponding active area of the antenna at this lower frequency.

US Patent Publication No. US 2010/039343 describes one such nested HIS topology. This document discloses an antenna reflector for a circular-polarized planar wire antenna where the reflector has an Electromagnetic BandGap structure and comprises a ground conductor having a plurality of first patch elements having resonance characteristics of a first frequency band placed at a given distance from the ground conductor and a plurality of second patch elements having resonance characteristics of a second frequency band aligned around the first patch elements, where the first frequency band is higher than the second frequency band. However, this implementation of enclosing a first region of the reflector having patch elements of a first frequency band by a second region of the reflector having patch elements of a second lower frequency band suffers from the drawback that it can only operate over frequency bands which are well spaced in frequency (typically multiples such as 3 GHz, 6 GHz, 9 GHz). The closest demonstrated spacing of two frequency bands in this implementation currently is at 35% apart.

US Patent Publication No. US 2013/249762 discloses an antenna which comprises a spiral and a reflector which comprises a hybrid structure comprising a first reflection region and a second reflection region. The first reflection region is a standard conductive reflector region which comprises an electrically conducting plane disposed at a distance from the antenna equal to a quarter of the mean wavelength of the radiation that it reflects, while the second reflection region comprises a HIS (AMC) type reflector. The first reflection region is designed to reflect a first sub-band of frequencies, while the second reflection region is designed to reflect a second sub-band of frequencies of lower frequencies than those of the first sub-band of frequencies. Similar to the arrangement in US Patent Publication No. US 2010/039343, the AMC type reflector region is aligned around the standard conductive reflector region. It will be appreciated however that this hybrid antenna structure suffers from the drawback associated with the use of a standard conductor reflector, in that it requires a separation between the antenna and the reflector of $\lambda_0/4$ at the higher sub-band of frequencies.

It is an object of the present invention to provide a CP SwaP multiband antenna which overcomes at least one of the above mentioned problems.

SUMMARY

The present invention provides a low SWaP, CP multi-band antenna which can operate over two distinct frequency ranges which are closely separated in frequency, thereby providing operation over two or more distinct allocated frequency bands, which are closely separated in frequency. The device utilises an innovative High Impedance Surface (HIS) ground plane on the underside of a spiral antenna, which provides electrical isolation from mounting surfaces. Thus, this device is suitable for worn on-body or vehicle mounted applications.

According to a first aspect of the invention there is provided, as set out in the appended claims, a circularly polarised, CP, antenna device for multiband GNSS comprising:

a spiral antenna; and
a high impedance surface, HIS, comprising:
a conductive layer split into a first region and a separate second region, and a ground plane,
wherein the first region of the conductive layer is provided with at least one resonant element of a first resonant frequency and the second region of the conductive layer is provided with at least one resonant element of a second resonant frequency.

In one embodiment, the first region comprises a first half of the conductive layer and the second region comprises a second half of the conductive layer.

In one embodiment, the at least one resonant element of a first resonant frequency comprises a periodic array of conductive resonant elements of a first size and the at least one resonant element of a second resonant frequency comprises a periodic array of conductive resonant elements of a second size.

In one embodiment, the periodic arrays of resonant elements comprise periodic arrays of one of: rectangles, hexagons, slots, spirals, Jerusalem crosses or fractal shapes.

In one embodiment, the device further comprises a plurality of vias connecting the conductive layer to the ground plane.

In one embodiment, the HIS further comprises a dielectric material coupled between the conductive layer and the ground plane.

In one embodiment, the dielectric material comprises one of Teflon, ceramic, alumina, or a quartz based material.

In one embodiment, the operating frequency band of the antenna is proportional to the dielectric constant and the thickness of the dielectric material.

In one embodiment, the dielectric constant and/or the thickness of the dielectric material are adapted for the antenna to operate over multiple allocated frequency bands.

In one embodiment, the spacing between the multiple frequency bands comprises a ratio of 1:1.2 or less.

In one embodiment, the device further comprises a resistive load coupled between the spiral antenna and the ground plane.

In one embodiment, the device further comprises a wide-band matching circuit positioned below the HIS.

In one embodiment, the wideband matching circuit comprises a marchand balun.

In one embodiment, the spiral antenna comprises a meandered spiral antenna.

In one embodiment, the thickness of the device comprises $\lambda_0/30$.

In one embodiment, the conductive layer is split into the first region and the second region along a substantially straight line.

In one embodiment, the straight line along which the conductive layer is split into the first region and the second region is offset from the centre line of the antenna.

In another embodiment of the invention there is provided an antenna array comprising a plurality of antenna devices.

The present invention also provides a circularly polarised, CP, antenna device for multiband GNSS comprising:

a spiral antenna; and
a high impedance surface, HIS, comprising:
a conductive layer comprising a first region and a separate second region, and
a ground plane,
wherein the first region of the conductive layer is provided with at least one resonant element of a first resonant frequency and the second region of the conductive layer is provided with at least one resonant element of a second resonant frequency.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 7:
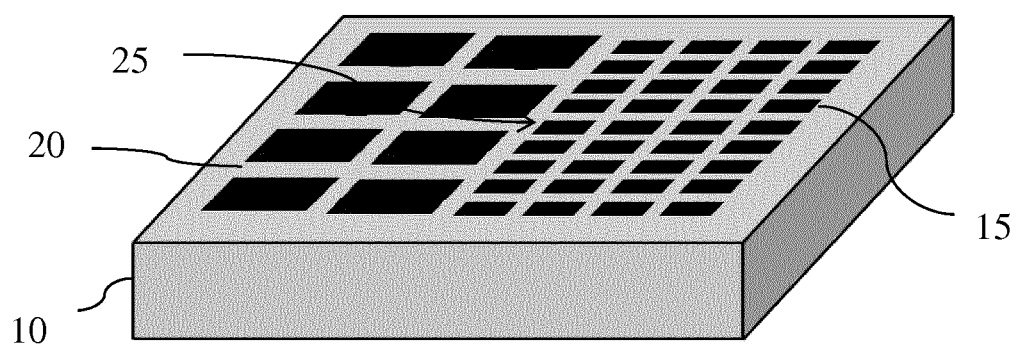
FIG. 7 shows one embodiment of the HIS topology of the antenna of the present invention.

The present invention will now be explained with the aid of the accompanying FIGS. 7 to 11. It comprises a CP antenna which comprises a spiral antenna 5 and a HIS 10. The HIS 10 comprises two distinct regions, each region provided with at least one resonant element. The size of the resonant elements in each of the two regions is different, as illustrated in FIG. 7. This results in the resonant elements in each region being of different resonant frequencies. Thus, the resonant elements of the first region 15 have a first resonant frequency at which the electrical phase of a reflected electromagnetic signal is 360° (or a multiple of n×360°, where n is an integer value) and the resonant elements of the second region 20 have a second resonant frequency at which the electrical phase of a reflected electromagnetic signal is 360° (or a multiple of n×360°, where n is an integer value). In the preferred embodiment of the invention, the HIS 10 comprises a substrate comprising a conductive layer and a ground plane, with the conductive layer comprising two periodic arrays of conductive resonant patch elements 25, which are connected to the common conductive ground plane by conductive vias. A dielectric material is coupled between the conductive layer and the ground plane. Any suitable dielectric material can be used, such as Teflon, alumina, ceramic or a quartz based material.

Figure 1:
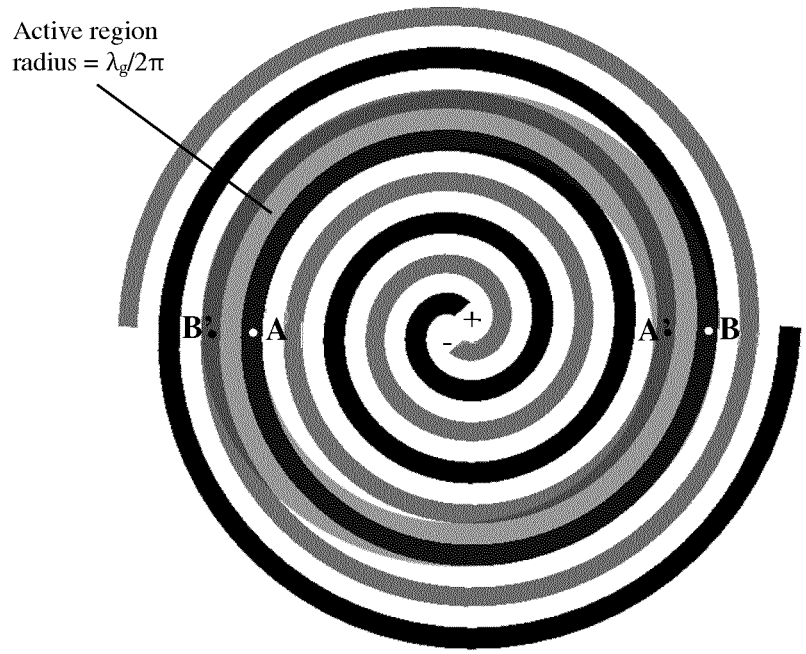
FIG. 1 shows a typical structure of a conventional spiral antenna.
Figure 2:
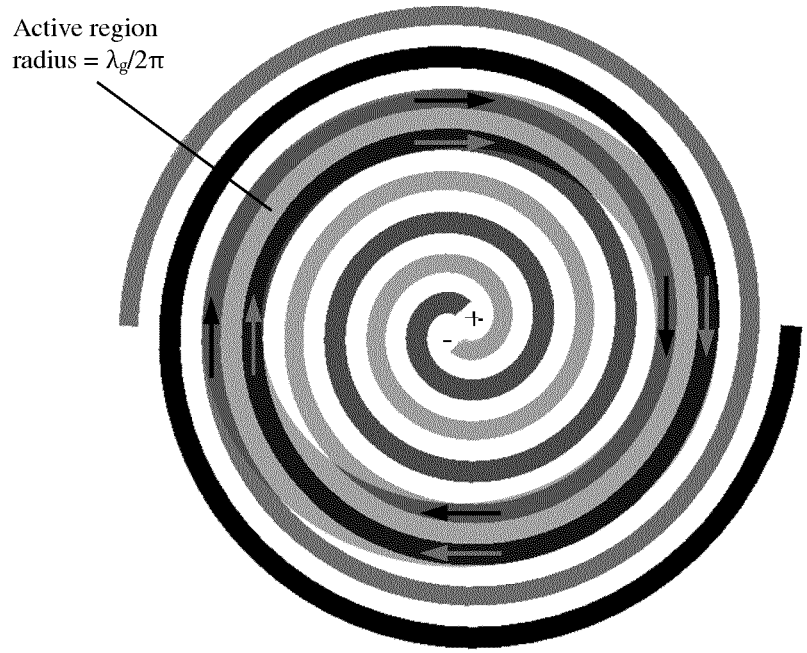
FIG. 2 shows the active region of the spiral antenna of FIG. 1.
Figure 3:
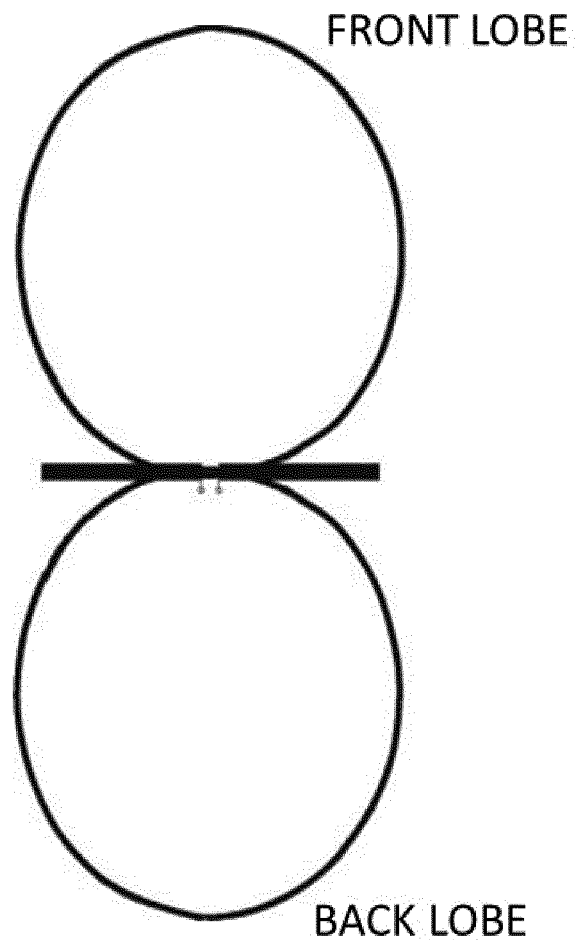
FIG. 3 shows the bi-directional radiation pattern of the antenna of FIG. 1.
Figure 4:
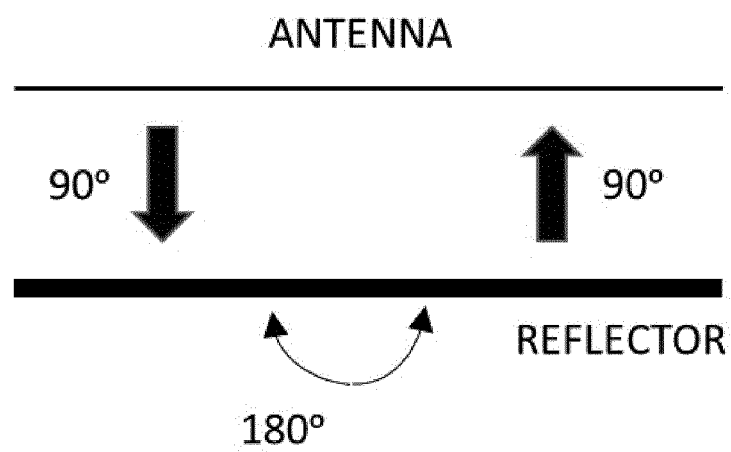
FIG. 4 shows the phase effect of using a conventional ground plane reflector in conjunction with a spiral antenna.
Figure 5:
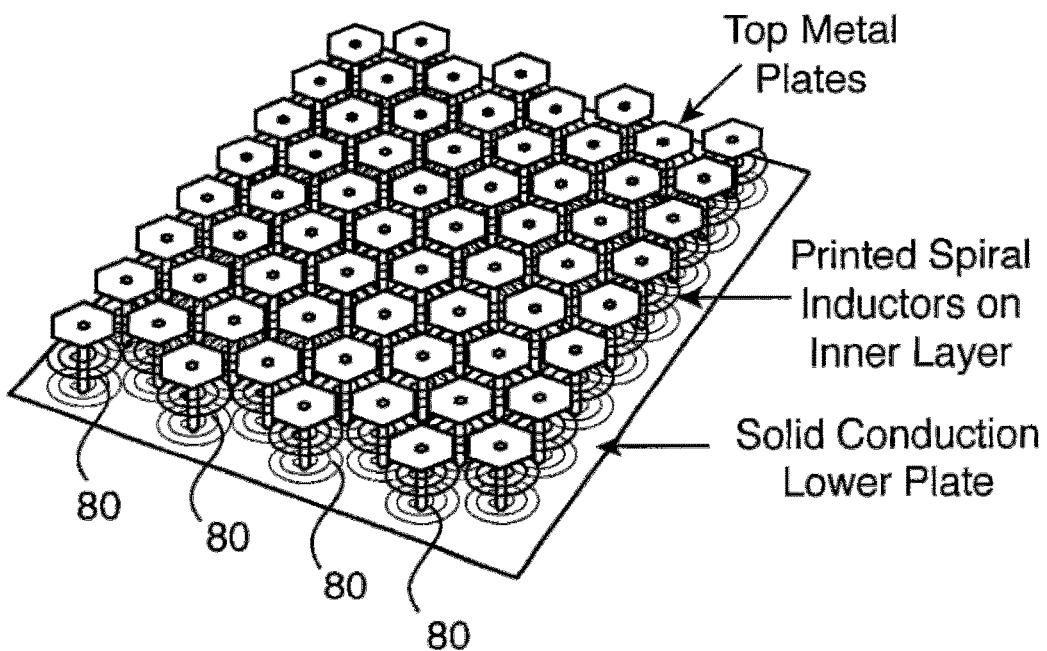
FIG. 5 shows the structure of one known high impedance surface topology of an antenna.
Figure 6:
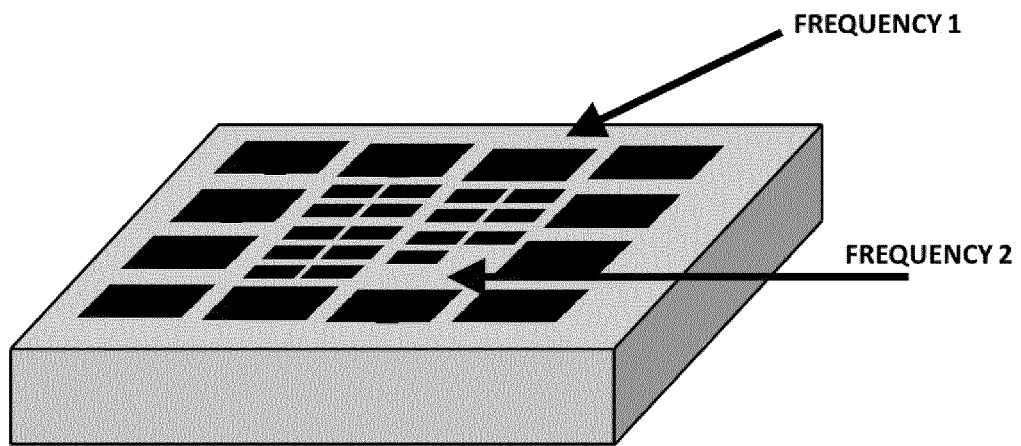
FIG. 6 shows the structure of another known high impedance surface topology of an antenna incorporating nested resonant elements.
Figure 11:
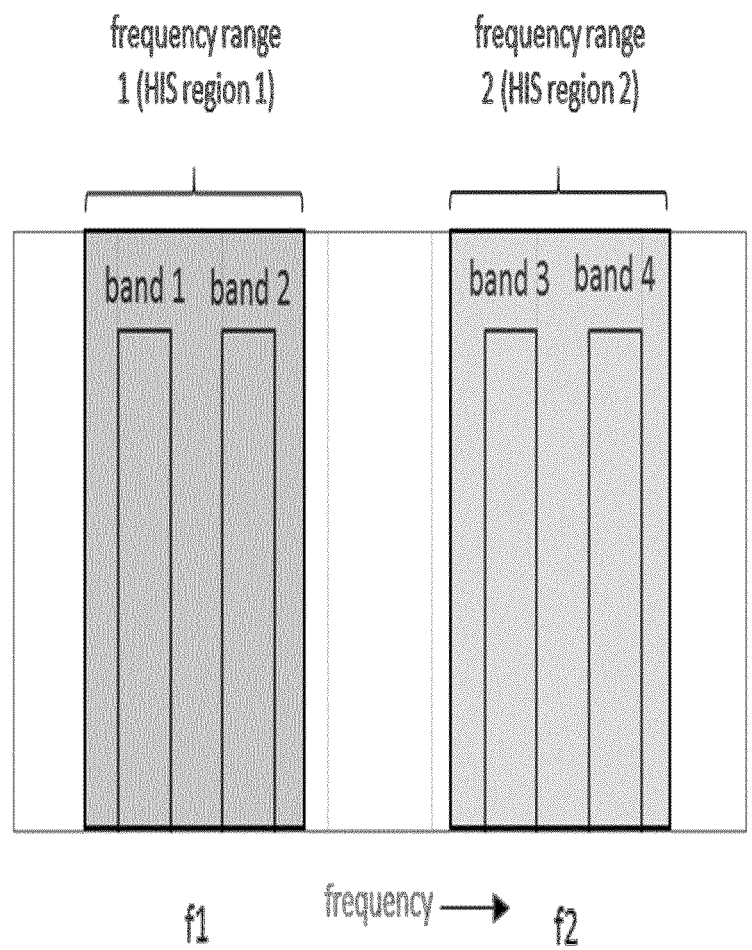
FIG. 11 shows two frequency ranges over which the antenna provides circular polarisation, which may cover multiple allocated frequency bands.

As each region or half of the HIS 10 uses a separate resonator, the antenna of the present invention can operate over two distinct frequency ranges. Each resonator corresponds to a single frequency at which the reflection is in phase with the antenna front lobe, theoretically giving an axial ratio of 0 dB. There is a range of frequencies above and below this frequency at which elliptically polarised radiation is produced which has an axial ratio which is >0 dB, but which may be adequately low for system requirements (for example, in many systems an axial ratio of <3 dB is considered acceptable as circular polarisation). Within these two frequency ranges, two or more allocated frequency bands may be accommodated. In the embodiment of FIG. 11, each frequency range comprises two bands. Furthermore, the two frequency ranges can be more closely spaced in frequency than the frequency spacing achievable through a spiral antenna which uses a nested HIS topology (such as that described in the background of the invention section). This is because for closely spaced frequencies, the active regions of the spiral can overlap. When using a nested HIS, the resonant elements cannot overlap or be of very similar size, because the resonant elements for the second frequency are surrounded by the resonant elements for the first frequency, as shown in FIG. 6. In contrast, due to the structure of the present invention where the HIS utilises two separate regions, the antenna radiates from one half of the active region for the first frequency, and from the opposite half for the second frequency. Therefore, the two spiral active regions can be closely located without a requirement for the HIS elements to overlap. In fact, the structure of the present antenna enables ratios of frequencies as low as 1:1.2 or even lower to be achieved.

During operation, in the first frequency range, back-lobe radiation from the region or half of the antenna 5 located adjacent to the first region 15 of the HIS 10 is reflected in phase, and adds constructively with the front lobe. Due to the fact that the second region 20 is configured to operate over the second frequency range, it acts similar to a standard conductive reflector with spacing much less than $\lambda_0/4$ at the first frequency range, and back-lobe radiation emitted in the first frequency range is reflected approximately in anti-phase and adds destructively with the front lobe radiation emitted over this region. The net effect is that approximately half of the total front and back-lobe radiation in the first frequency range adds constructively and is radiated into free space in the front-lobe, with no radiation emitted in the back-lobe direction. The operation of the second frequency range is the reverse, such that again approximately half of the radiation is emitted into free-space in the front-lobe and none of the radiation is emitted in the back-lobe direction. This arrangement therefore enables front-lobe radiation with good circular polarisation properties to be achieved for two very closely spaced frequency ranges, using a very thin antenna which has a ground plane (for example a thickness of 0.033 lambda), and which is also is suitable for surface mounting.

It should be understood that the first and second halves or regions need not be of equal size or of equal thickness. It should further be understood that the line along which the conductive layer of the HIS is split into the two halves may be offset from the centre line of the antenna.

Moreover, by increasing the dielectric constant and/or the thickness of the substrate, the two separate bands can be made to provide coverage over a wider frequency range. In this regard, it should be understood that whilst the antenna would still in fact operate over two distinct frequency ranges, by extending their bandwidths, the antenna can provide coverage over an increased number of multiple frequency band allocations.

By increasing the dimensions of the spiral antenna itself, the bandwidth of operation of the antenna can also be increased. In this case, the HIS of the present invention with two regions, shown in FIG. 10, could be applied to the nested HIS approach shown in FIG. 6, whereby each of the nested regions would be split into two separate halves or regions, providing 4 total HIS regions, providing CP radiation over 4 separate frequency ranges. Moreover, this approach could be applied to multiple (more than two) nested regions, giving a plurality of operating frequency ranges.

In the described embodiment of the invention shown in FIG. 7, the HIS resonant elements 25 are square patches. However, these resonant elements 25 can equally well be of a variety of different types of shapes or sizes, such as hexagons, spirals, crosses or slots. The size of the resonant elements provided on each region is dependent upon physical factors. These include design frequency, dielectric material permittivity and thickness, and mode of operation.

While in the described embodiment of the invention a dielectric substrate is provided between the two conductive layers, it will be appreciated that in an alternative embodiment of the invention, no dielectric substrate is provided. Similarly, in an alternative embodiment of the invention, no vias are provided to connect the two conductive layers of the HIS.

In one embodiment of the invention, the gain of the antenna is passive. This means that the gain is achieved without the use of an amplifier, through the antenna focussing the power.

Figure 8:
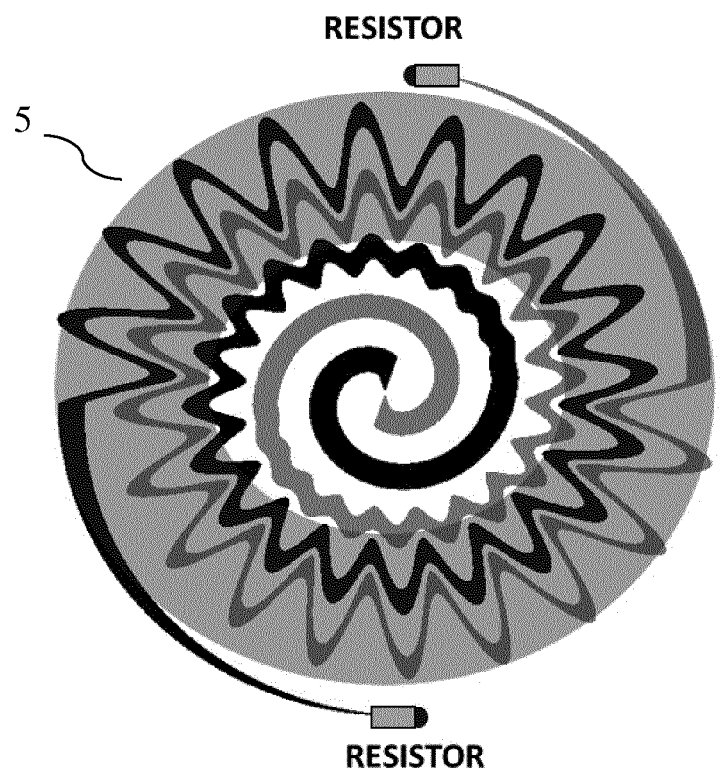
FIG. 8 shows an embodiment of the present invention where the antenna has a meandered spiral topology and incorporates resistive impedance matching.

It is typically found that when a spiral antenna is placed in very close proximity to a HIS (for example $<\lambda_0/12$ apart), the HIS loads the antenna, giving rise to reflections from the end of the spiral antenna arms. This in turn leads to poor circular polarisation performance (high axial ratio) and high antenna VSWR. In accordance with one embodiment of the invention, these reflections can be reduced through the use of resistive loading connected from the end of the antenna arms to the ground plane of the HIS through vias, as illustrated in FIG. 8. By using a dielectric with relative permittivity >1 instead of an air gap or foam core between the spiral antenna and the HIS, the electrical thickness of the gap can also be maintained whilst the physical thickness is reduced. This can be applied to reduce the device thickness. The combination of these techniques enables the antenna of the present invention to be operated with thicknesses of as low as $\lambda_0/30$, depending on the desired frequency/wavelength of operation. It also improves the radiation quality performance.

The spiral antenna can be of any known geometry, including a meandered geometry. It will be appreciated that this geometry reduces the surface area of the spiral antenna, as shown in FIG. 8.

Figure 9:
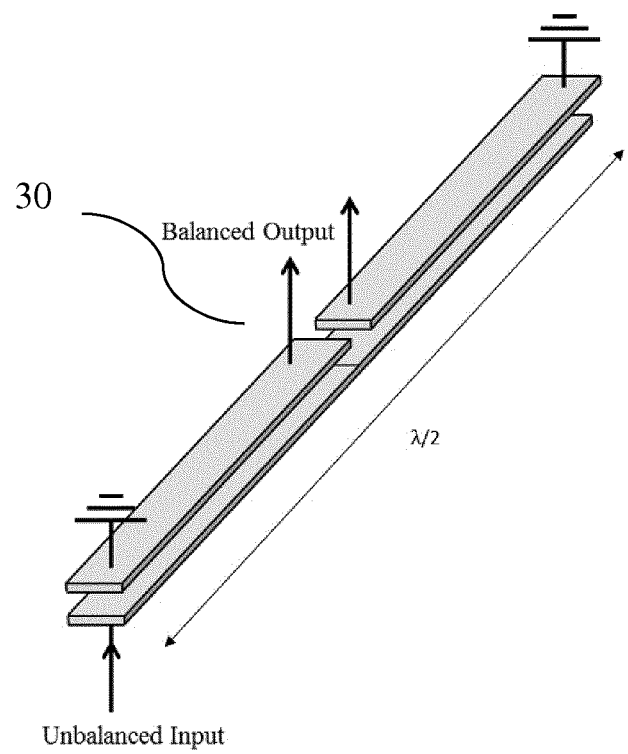
FIG. 9 shows a balun which may incorporated into the antenna of the present invention below the high impedance surface, in order to provide a broadband 50Ω match.
Figure 10:
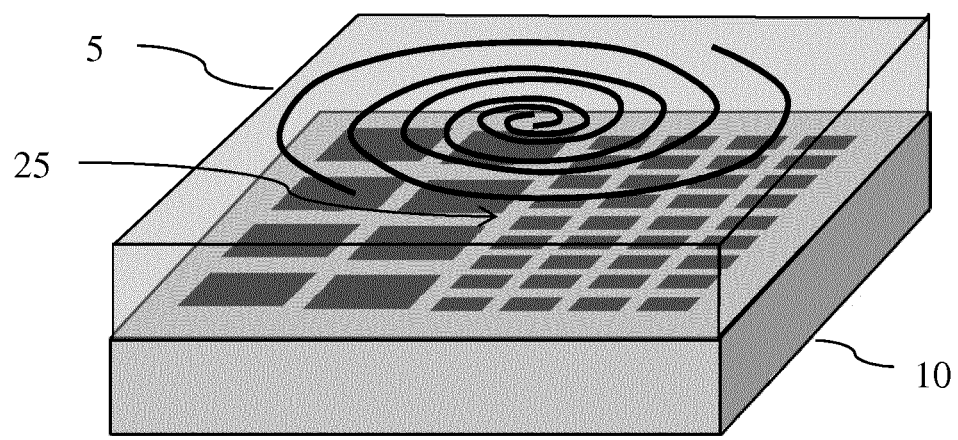
FIG. 10 shows a perspective view of the antenna of the present invention.

In a further embodiment of the device, a wideband matching circuit may be incorporated into the antenna. FIG. 9 shows one such implementation, where a balun (balanced circuit to unbalanced circuit connector) in the form of a marchand balun 30 is positioned under the high impedance surface in order to provide a broadband 50Ω match. This may be implemented by adding additional layers of circuitry on the underside of the HIS ground plane, which are fed at an unbalanced input (for example using an SMA connector), and are connected to the centre of the antenna spiral arms at the balanced output.

The spiral antenna of the present invention has numerous advantages over existing spiral antennas where unidirectional circularly polarised radiation and electrical isolation is required.

Firstly, splitting the high impedance surface into two regions or halves allows the two distinct frequency ranges to be spaced more closely together than is possible with existing multi-band circularly polarised spiral antennas, such as those using nested high impedance surfaces. This makes the antenna suitable for systems such as multiband GNSS, which have separate allocated frequency band edges spaced as closely as 2% apart in frequency.

A further advantage of the antenna of the present invention is that its weight and dimensions can be made smaller than what is possible with a spiral antenna used in conjunction with an absorber, or a spiral antenna used in conjunction with a ground reflector. In addition, the antenna provides improved bandwidth over a spiral antenna used in conjunction with a ground reflector.

The present invention is also very suitable for use with meandered spiral antennas, where the active regions of different frequency bands overlap due to meander heights, which makes conventional methods of multi-band high impedance surfaces especially difficult for applications requiring closely separated frequency bands. The use of a meandered spiral results in a very compact design of antenna operating over two closely spaced frequency ranges.

The present invention can also be applied to arrays of antennas. This arrangement would typically involve a structure consisting of the antenna repeating with a fixed spacing along one or two axes (i.e. a linear or a rectangular array).

It will be appreciated that the invention can be used in any application where a circularly polarised electromagnetic signal is radiated, such as for example communications, radar and imaging systems.

One such application is multi-band, multi satellite, GNSS coverage, for example GPS tracking. For personal positioning, the antenna may be attached for example onto an item of clothing or a helmet for use by dismounted troops and emergency services workers. Equally, it could be used as a surface mounted device for precise tracking of vehicles (such as for example cars and trains), as well as automated vehicles and drones.

Furthermore, as the invention provides multi-band capabilities, it is very robust and can provide built in channel redundancy in applications where loss of signal is critical to operation.

The invention claimed is:

1. A circularly polarised antenna device for multiband GNSS, the device comprising:
   a spiral antenna; and
   a high impedance surface comprising:
      a conductive layer comprising
         a first region, with at least one resonant element of a first resonant frequency, for operating at a first frequency range; and
         a separate second region, with at least one resonant element of a second resonant frequency, for operating at a second frequency range different from the first frequency range; and
      a ground plane;
   wherein the first and second regions are split along a substantially straight line;
   wherein the first region comprises a first half of the conductive layer and the second region comprises a second half of the conductive layer.

2. The device of claim 1, wherein the at least one resonant element of a first resonant frequency comprises a periodic array of conductive resonant elements of a first size and the at least one resonant element of a second resonant frequency comprises a periodic array of conductive resonant elements of a second size different from the first size.

3. The device of claim 2, wherein the periodic arrays of resonant elements comprise periodic arrays of one of: rectangles, hexagons, slots, spirals, Jerusalem crosses or fractal shapes.

4. The device of claim 1, further comprising a plurality of vias connecting the conductive layer to the ground plane.

5. The device of claim 1, wherein the high impedance surface further comprises a dielectric material coupled between the conductive layer and the ground plane.

6. The device of claim 5, wherein the dielectric material comprises one of Teflon, ceramic, alumina, or a quartz based material.

7. The device of claim 5, wherein the operating frequency band of the antenna is proportional to the dielectric constant and the thickness of the dielectric material.

8. The device of claim 7, wherein the dielectric constant and/or the thickness of the dielectric material are adapted for the antenna to operate over multiple allocated frequency bands.

9. The device of claim 8, wherein the spacing between the multiple frequency bands comprises a ratio of 1:1.2 or less.

10. The device of claim 1, further comprising a resistive load coupled between the spiral antenna and the ground plane.

11. The device of claim 1, further comprising a wideband matching circuit positioned below the high impedance surface.

12. The device of claim 11, wherein the wideband matching circuit comprises a marchand balun.

13. The device of claim 1, wherein the spiral antenna comprises a meandered spiral antenna.

14. The device of claim 1, wherein the thickness of the device comprises $\lambda_0/30$.

15. The device of claim 1, wherein the substantially straight line along which the conductive layer is split into the first region and the second region is offset from the centre line of the antenna.

16. An antenna array comprising a plurality of the devices of claim 1.

\* \* \* \* \*